D. UTLEY.
Sad-Iron Heater.

No. 67,381.

Patented July 30, 1867.

Witnesses:
Chas. J. Spencer
J. A. Davis

Inventor:
David Utley,
By J. Fraser & Co.
Atty

United States Patent Office.

DAVID UTLEY, 2D, OF MOSCOW, NEW YORK.

Letters Patent No. 67,381, dated July 30, 1867.

---

SAD-IRON HEATER.

---

*The Schedule referred to in these Letters Patent and making part of the same.*

---

TO ALL WHOM IT MAY CONCERN:

Be it known that I, DAVID UTLEY, 2d, of Moscow, in the county of Livingston, and State of New York, have invented a certain new and useful Improvement in Sad-Iron Heaters; and I do hereby declare that the following is a full and exact description thereof, reference being had to the accompanying drawings, making part of this specification.

Like letters of reference indicate corresponding parts in both figures.

My invention consists in combining with a shell for receiving the sad-irons a series of slides, which are made to move around and cover the slots in which the handles rest, and in providing said slides with thicknesses of sheet iron, so that the purchaser can cut the notches of just such size as to fit his handles.

Figure 2:
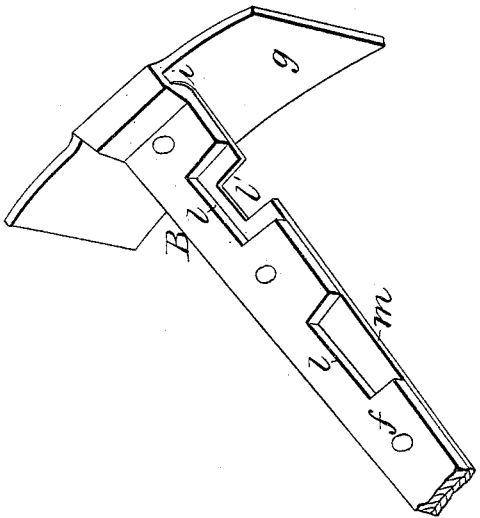
Figure 2 is a perspective view of one of the slides.
Figure 1:
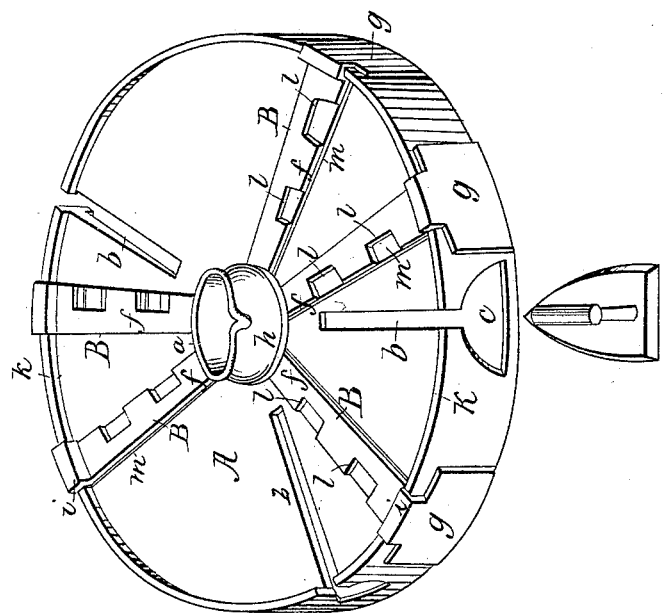
Figure 1 is a perspective view of my improved heater.

As represented in the drawings, A is a shell made preferably in circular form, with the bottom open to receive the heat of the stove over which it is placed. It may be provided with a loop, $a$, by which it is handled. In the top of this shell is made a series of radial slots, $b\ b$, to allow the passage of the handles of the sad-irons, and in the rim is made a corresponding series of openings, $c\ c$, to allow the passage of the bodies of the irons. If desired, the shell may be made in sections hinged at the inner ends, in which case the large openings in the rim are dispensed with and simple slots made like those on top to give passage to the handles, the sections turning up for the admission of the body. On top the shell rest slides B B, corresponding in number with the slots and openings. These slides consist of shanks, $f$, and vertical sides, $g$, the former covering the slots on top and the latter the opening on the sides of the shell. The inner ends of the slides may be retained in place by a loose centre disk, $h$, and the outer ends by grooves, $i$, which rest on a projecting rim, $k$, of the shell. Thus arranged the slides may be moved round in any position, and may be easily detached at any time desired. The main portions of the shanks are provided with notches or sockets, $l\ l$, at such position as to correspond with the sides of the handle when inserted in the slots, and of such size as to receive handles of the maximum size. The under sides of the shanks have thicknesses of sheet metal, $m\ m$, which are made to cover the notches $l$, as shown at the left hand in fig. 2. Thus arranged, the action will be readily understood. The irons are inserted in the shell, with the handles resting in the slots, and when in position the slides are moved up so as to close the slots and openings $b\ c$. Since the sizes of the handles vary in different irons the sheet metal of the slides is left entire by the manufacturer, as before stated, and the purchaser gauges the size of his handles, and then with a suitable instrument cuts out the sheet metal to an exact fit, as shown at $l'$, fig. 2. In this manner the size of the notch is adapted exactly to the size of the handle, and there is no unnecessary open space left. This enables the same slides to be adapted to different irons, an effect that is accomplished in no other sad-iron heater within my knowledge. The slides arranged in this manner close the shell as nearly tight as possible by shutting the slots and openings. Thus there is no unnecessary loss of heat; and not only this, but while the heat is confined and retained about the body of the irons, thus insulating them, the handles are removed as much as possible from the heat.

I am aware of no other sad-iron heater in which slides have been thus employed for closing the slots of the heater. I am aware that an upright furnace-heater has been before used, in which the irons are let down into heating spaces, with a sliding cover over the top, but in such case the side slots, in which the handles rest, are still left open. Such an arrangement I do not claim.

What I claim as my invention, and desire to secure by Letters Patent, is—

1. The combination of the slides B with the shell A, so arranged as to slide around and cover the slots around the handles, as herein set forth.

2. The employment of the thicknesses of sheet metal $m$, in combination with the slides, so arranged as to be notched to adapt them to different-sized handles, as herein set forth.

3. Retaining the slides in position in the shell by the grooves $i$ and projecting rim $k$, as specified.

In witness whereof I have hereunto signed my name in the presence of two subscribing witnesses.

DAVID UTLEY, 2D.

Witnesses:
F. G. WICKER,
H. C. ALLEN.